United States Patent
James et al.

(10) Patent No.: US 6,317,191 B1
(45) Date of Patent: Nov. 13, 2001

(54) PROCESS FOR VIEWING A POSITIVE MOTION PICTURE FILM SCENE IMAGE WITH INTEGRAL AUDIO SOUNDTRACK

(75) Inventors: Robert O. James, Rochester; Charles C. Anderson, Penfield; Ronald E. Uhlig, Pittsford; Keith A. Walker, Canandaigua; David C. Markham, Pittsford, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/409,789

(22) Filed: Sep. 30, 1999

(51) Int. Cl.[7] .............................. G03B 31/00; G03B 31/02
(52) U.S. Cl. .................................. 352/5; 352/26; 352/27; 352/37
(58) Field of Search .................................... 352/1–37, 44; 430/140, 490; 427/127, 128; 386/96; 396/312, 319; 355/98, 31

(56) References Cited

U.S. PATENT DOCUMENTS

| | | | |
|---|---|---|---|
| 4,003,743 | 1/1977 | Akashi et al. | 430/140 |
| 4,146,312 * | 3/1979 | Amikura et al. | 352/27 |
| 4,279,945 | 7/1981 | Audran et al. | 427/130 |
| 4,341,855 | 7/1982 | Morrison et al. | 430/140 |
| 4,461,552 | 7/1984 | Levine | 352/27 |
| 4,600,280 | 7/1986 | Clark | 352/37 |
| 4,893,921 | 1/1990 | Beauviala | 352/92 |
| 4,938,585 | 7/1990 | Weiffenbach et al. | 352/92 |
| 4,965,627 | 10/1990 | Robison | 352/40 |
| 5,557,423 | 9/1996 | Phillips et al. | 352/96 |
| 5,633,127 | 5/1997 | Nair et al. | 430/496 |
| 5,655,164 | 8/1997 | Tsai | 396/312 |
| 5,856,057 * | 1/1999 | Sinn et al. | 430/140 |

FOREIGN PATENT DOCUMENTS

90/15361  12/1990  (WO) .

OTHER PUBLICATIONS

"DATAKODE Magnetic Control Surface", Eastman Kodak Company, 1983 (Publication No. V3–517).

* cited by examiner

Primary Examiner—Russell Adams
Assistant Examiner—Rodney Fuller
(74) Attorney, Agent, or Firm—Andrew J. Anderson

(57) ABSTRACT

A process for viewing a positive motion picture film scene image with an accompanying original audio soundtrack comprising: providing a motion picture origination negative film comprising a support bearing at least one light sensitive image recording layer and a transparent magnetic recording layer; optically recording a motion picture scene in the motion picture negative film by exposing the film in a motion picture camera, and simultaneously recording contemporaneous original audio information in the magnetic recording layer on a frame-by-frame basis in synchronization with the scene image; providing a motion picture print film comprising a support bearing at least one light sensitive image recording layer and a transparent magnetic recording layer; printing the negative film scene image onto the motion picture print film to form a positive scene image, and transferring the original audio information from the magnetic recording layer of the negative film to the magnetic recording layer of the print film in synchronization with the printed scene image, and projecting the print film scene image for viewing while simultaneously reading and playing back the original audio information recorded in the magnetic recording layer. The present invention provides a convenient method to capture, store, and read integral audio information on a frame-by-frame basis in synchronization with a motion picture film image without the need to synchronize two separate media during viewing of the film. Audio information is recording directly onto a motion picture film during filming of a motion picture scene. Both the image and audio information captured during filming can be easily transferred to a motion picture positive film thus allowing to quickly provide synchronous, integral audio information such as dialogue for dailies.

10 Claims, 4 Drawing Sheets

PROCESS FOR VIEWING A POSITIVE MOTION PICTURE FILM SCENE IMAGE WITH INTEGRAL AUDIO SOUNDTRACK

FIELD OF THE INVENTION

The present invention relates generally to fields of motion picture, television and other multi-media production. More particularly, the invention relates to methods for recording original audio information directly onto a motion picture, television or other multi media photographic origination film during the scene filming.

BACKGROUND OF THE INVENTION

Synchronization of multiple media sources such as a motion picture photographic image and sound (audio) information in a final motion picture print film, i.e., the film that is shown in movie theaters, is a problem which the motion picture production industry has faced for many decades. The techniques required for recording photographic images on movie film and those by which sound is recorded on a suitable sound recording medium are quite different. Therefore, it has been common since the early days of sound films to employ two independent pieces of equipment for recording image and audio information. In the early days, images were invariably recorded as a sequence of frames on a continuous strip of photographic film, while audio was recorded as a microscopic wavy groove in either a wax cylinder or a wax disk. Some audio was recorded on the set, but much audio was recorded or re-recorded or dubbed while observing a screening of the film. Synchronization of a projected picture with corresponding audio recorded in a separate medium was quite crude. Picture and audio would be started at a reference point established at the program. The speed of one or the other would be manually adjusted when loss of synchronization was observed. However, such techniques provide very poor synchronization.

In modern studios, images may be recorded on film in a variety of formats. Audio is likely to be recorded on magnetic recording tape called a sound tape, also in a variety of formats. Whenever multiple tracks of source material are used to create a final production or composition, synchronization of one or more images with one or more tracks of audio may be required. The use of a customary slate at the beginning of each take of a scene helps facilitate synchronization of audio recorded on the set with picture recorded on the set. The slate produces a sharp and distinct sound on the audio recording, simultaneous with an identifiable visual event, such as a bar hitting the top of the board. Additionally, during recording, the camera and the audio recording equipment may be mechanically or electrically synchronized, so that corresponding lengths of film and audio media are used. Consequently, to synchronize these source media for editing or viewing requires that the sound of the slate in the audio track be aligned with the image of the bar hitting the top of the board. Then the two media may be mechanically or electrically locked together for playback or editing.

For greater flexibility, including the use of multiple sound tracks recorded in separate media either on the set or off the set, timecodes have been developed for aiding in the establishment and maintenance of synchronization in the circumstances such as described above. One type of commonly used timecode is that developed by the Society for Motion Picture and Television Engineers (SMPTE), which may be imprinted in an unused margin of the film or audio media during filming so as to indicate an absolute time reference for each frame of film. The imprinting of the SMPTE timecodes may be human readable, e.g., as numbers in the margin of the film, or may be machine readable, e.g. as bar codes in the margin of the film. Another time reference used on film media is the Eastman Kodak KEYKODE number. Among other things, the KEYKODE number acts as a roll and frame counter, by which any frame of a production may be absolutely identified. KEYKODES are recorded in the form of a latent image of the code data on film stock at the time of manufacture, after emulsion coating of the film base, in the film margin.

Synchronization during playback of multiple media sources may be achieved as follows. First, all the media are aligned manually to a starting point.

During playback, timecodes may then be read off all of the media to be synchronized. The playback speeds of the media are then adjusted so as to cause the timecodes read off the media to coincide throughout the playback. Such systems employ standard feedback techniques to cause the playback speeds of all the media but one to follow the playback speed of the one.

To eliminate the need for real time synchronization of images and sound during viewing of a motion picture, motion picture print films commonly employ optical soundtracks along at least one edge of the film, which sound tracks are already synchronized with the images. During projection of the motion picture images, a light source illuminates the soundtrack and a photosensor senses the light passing through and modulated by the soundtrack to produce an audio signal that is sent to amplifiers of the theater sound system. The most common optical soundtracks presently in use are analog soundtracks of the "variable area" type wherein signals are recorded in the form of a varying ratio of opaque to relatively clear area along the soundtrack. Digital soundtracks for motion picture films have been more recently introduced, wherein sound information is recorded in a digital format, e.g. comprising small data bit patterns on the film, typically between perforations of the motion picture film (e.g., Dolby™ Digital Stereo soundtracks) or along the film edge (e.g., Sony™ Dynamic Digital Sound soundtracks). U.S. Pat. Nos. 4,600,280 and 4,461,552, e.g., disclose methods in which digital audio is photographically recorded on motion picture film.

In order to optimize the visual quality of the motion picture image as well as the sound quality of the soundtrack recorded on a motion picture print film, the motion picture and soundtrack are first typically captured or recorded on separate photosensitive films as negative images, and the resulting negatives are then printed in synchronization on a motion picture print film to form positive images. Optical soundtrack negatives are typically best recorded with high contrast, relatively slow speed films (e.g., Eastman Sound Recording Films) in order to generate desired sharp images for the sound recording and minimize background noise generated by relatively high minimum densities typically associated with relatively fast camera negative origination films. Exposure of the optical soundtrack negative is conventionally performed in response to sound information recorded in a master magnetic sound tape (which may comprise a compilation of original audio, dubbing, music, sound effects, etc.).

The above discussion of sound and image synchronization primarily relates to conventional practice associated with production of a final print film designed for projection in a theater. Such production typically involves extensive editing procedures involving both images and sound, in addition to synchronization of the final edited images and sound track.

When a motion picture film director desires to periodically check the quality of work then being filmed, he may rely on viewing print film images (commonly known as "dailies") or telecine transfer images made from rolls of origination film shot in the previous day. While it may be useful to provide original audio (e.g., actual original dialogue of actors in a scene) with a daily print to aid in evaluation of the work, dailies must be quickly prepared, and providing audio information in the form of an optical soundtrack would be inconvenient and costly as it would require the generation of a separate sound negative film recording and synchronized printing thereof on the print dailies as discussed above. Dailies accordingly do not typically include integral audio information, but rather conventionally are viewed as silent films. Various systems have been proposed for providing playback of audio or other information associated with a scene recorded on separate media during viewing of a print of the scene (including U.S. Pat. Nos. 4,893,921, 5,557,423, and WO 90/15361), but such systems invariably require a separate timing code or synchronization feature which adds to the complexity and costs of such systems. Even if original audio information were available for presentation with dailies in accordance with such systems, there would still be the requirement of aligning and synchronizing separate source media each time a daily print was to be viewed, which would lead to possible complexities and errors.

The use of magnetic recording stripes or layers in photographic elements has been previously disclosed. An innovation in data communication between different stages of film use and processing for motion picture film was introduced as described in the publication "DATAKODE Magnetic Control Surface" by Eastman Kodak Company 1983 (Publication No. V3-517). A layer approximately 5 $\mu$m thick containing magnetic oxide particles was coated across the entire back surface of a roll of motion picture film to provide the capability to magnetically record digital data on the film without interfering with normal photographic use of the film. It has been suggested that this permitted recording of different types of digital data at different stages of production of a motion picture which allowed for information exchange such as camera, lighting and filter data at the time of shooting to printer exposure control information in the laboratory to theater automation control signals during exhibition. The use of magnetic recording strips or layers on motion picture films for recording and playing back audio information has also been disclosed, such as in U.S. Pat. Nos. 4,003,743, 4,279,945, 4,341,855, 5,633,127. More recently, it has been proposed to employ a virtually transparent magnetic layer on still photography filmstrip to allow for magnetic recording of data in one or more longitudinal tracks associated with individual film image frames for information exchange purposes as part of the recently introduced Advanced Photo System. An example of such a system is described in commonly assigned U.S. Pat. No. 4,965,627 issued Oct. 23, 1990. In order to provide quick access to particular data at any stage of film use, related data is preferably grouped and recorded in specific predetermined tracks. Camera data is recorded in several dedicated longitudinal tracks located along the filmstrip edges. The data is preferably recorded in pulse position encoded form in order to be largely independent of film transport velocity. There has been no specific suggestion of a convenient method, however, to provide original audio soundtracks on motion picture print dailies prepared from origination motion picture negative films which may be easily used to provide a playback of original audio while viewing the dailies without the need for special synchronization procedures.

It is a general aim of the present invention to provide a convenient method for recording audio information directly onto a motion picture film during filming of a motion picture scene, and for playback of original audio information stored on a motion picture film during viewing of the recorded motion picture scene.

SUMMARY OF THE INVENTION

In accordance with the present invention there is provided a process for viewing a positive motion picture film scene image with an accompanying original audio soundtrack comprising: providing a motion picture origination negative film comprising a support bearing at least one light sensitive image recording layer and a transparent magnetic recording layer; optically recording a motion picture scene in the motion picture negative film by exposing the film in a motion picture camera, and simultaneously recording contemporaneous original audio information in the magnetic recording layer on a frame-by-frame basis in synchronization with the scene image; providing a motion picture print film comprising a support bearing at least one light sensitive image recording layer and a transparent magnetic recording layer; printing the negative film scene image onto the motion picture print film to form a positive scene image, and transferring the original audio information from the magnetic recording layer of the negative film to the magnetic recording layer of the print film in synchronization with the printed scene image, and projecting the print film scene image for viewing while simultaneously reading and playing back the original audio information recorded in the magnetic recording layer.

The present invention provides a convenient method to capture, store, and read integral audio information on a frame-by-frame basis in synchronization with a motion picture film image without the need to synchronize two separate media during viewing of the film. Audio information is recording directly onto a motion picture film during filming of a motion picture scene. Both the image and audio information captured during filming can be easily transferred to a motion picture positive film thus allowing to quickly provide synchronous, integral audio information such as dialogue for dailies.

DETAILED DESCRIPTION OF THE INVENTION

The present invention provides a process for viewing a positive motion picture film scene image with integral audio soundtrack. During filming of a motion picture scene, audio information such as the scene dialogue is recorded onto a camera original negative film containing a transparent magnetic recording layer on a frame-by-frame basis in synchronization with the film image. The audio information recorded on the camera original negative film is transferred to a motion picture positive ("print") film containing a transparent magnetic recording layer before, during, or after transferring the photographic image from the camera negative film to the positive print film. The positive motion picture print film is then viewed with accompanying audio soundtrack which is replayed from the transparent magnetic recording layer.

In the practice of the present invention, during filming of a scene of a motion picture, original audio information (for example, dialogue) may be captured with a microphone, digitized, and recorded on a frame-by-frame basis on the camera negative motion picture film using a motion picture camera equipped with a magnetic recording (write) head. Preferably, the audio information is recorded adjacent to the image area to which it corresponds so that if a film splice is required due to film breakage, for example, the film image and audio information will remain in synchronization.

A motion picture camera may be equipped with a magnetic write head(s) for recording the audio information and, optionally, a magnetic read head(s) to verify that the data is being correctly recorded. The position of the write/read heads in the camera can vary from camera type to camera type, depending on the space available in the camera body or the magazine. However, the magnetic heads must be located one or more frames past the camera aperture to allow for frame-integral data recording during the film pull-down cycle. In this case, to properly compensate for the one or more frame offset, the audio data may be briefly stored in buffer memory and then recorded when the frame for which the audio data corresponds moves past the magnetic head. Alternatively, it may be possible to use a separate module containing the magnetic head which is placed between the camera magazine and the camera body so that no modifications are required to either the camera or the magazine. Again, in this case it is necessary to temporarily store the audio data in memory then write to the magnetic recording layer when the corresponding image frame moves past the write head contained in the module. In many respects this is a preferred mode because magnetic recording is prone to tape speed variation errors (jitter), hence if the write/read heads are located closer to the take-up or supply reel, the more constant is the speed of the film surface.

Figure 1:
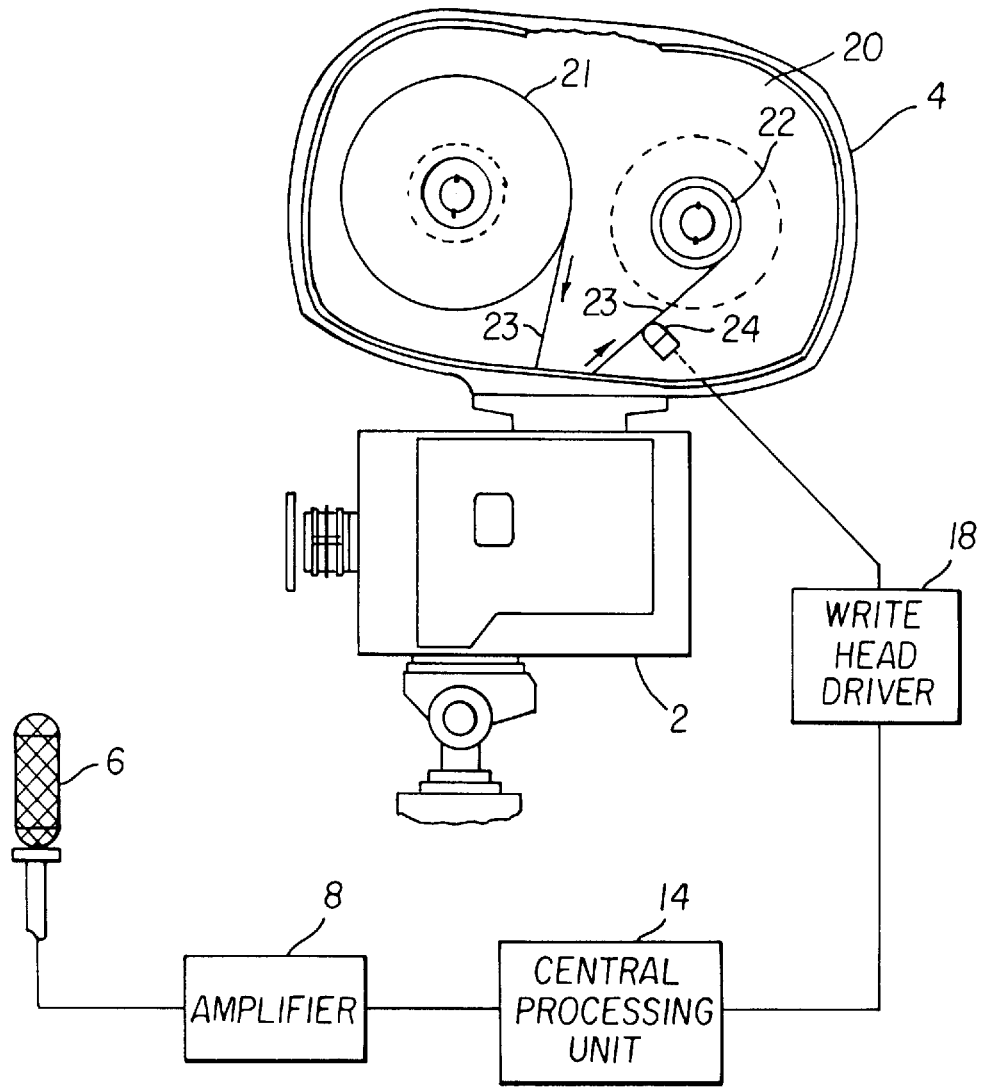
FIG. 1 is a diagram showing a system for recording audio information such as scene dialogue onto a motion picture camera negative film during filming of a motion picture scene.

FIG. 1 represents a schematic diagram illustrating the positioning of audio recording apparatus including a motion picture camera containing a magnetic write head which may be used in accordance with a particular embodiment of the invention. Referring now to FIG. 1, a motion picture camera 2 which is employed to film a movie scene is equipped with film magazine 4 which is depicted with its cover removed to show interior space 20. A supply reel of film 21 and a takeup reel of film 22 are mounted within the interior space 20. Film strip 23 extends from the supply reel 21 and passes into the interior of the motion picture camera 2 where the film is exposed. After exposure in the motion picture camera 2, film strip 23 is conveyed back into the film magazine 4 and wound onto takeup reel 22. In the particular embodiment illustrated, magnetic write head 24 positioned before takeup reel 22 records audio information onto a transparent magnetic recording layer contained on the backside of film strip 23 as it passes by the magnetic write head 24. Audio information such as scene dialogue is captured by microphone 6, relayed to amplifier 8, and sent to central processing unit 14 wherein such audio information may undergo compression, error correction, formatting, and coding. The audio information is sent to write head driver 18 and then to magnetic write head 24 which records the audio information onto film strip 23.

After conventional photoprocessing of the negative film, the audio soundtrack may then be transferred from the processed camera negative film to a positive motion picture film (for example, a so-called "workprint") on-line, that is, during the contact printing operation that is used to transfer the film image from the exposed and processed camera negative film to the positive film.

Alternatively, the audio soundtrack may be transferred off-line, that is, before optical printing, after optical printing, or after optical printing and film processing of the positive film. Preferably, the audio data is transferred on-line, so as to eliminate the need for any re-registration of the negative and print films.

Conventional magnetic heads may be used for transferring the audio information from the negative film to the positive film, and such heads are preferably mounted directly on the contact printer.

Figure 2:
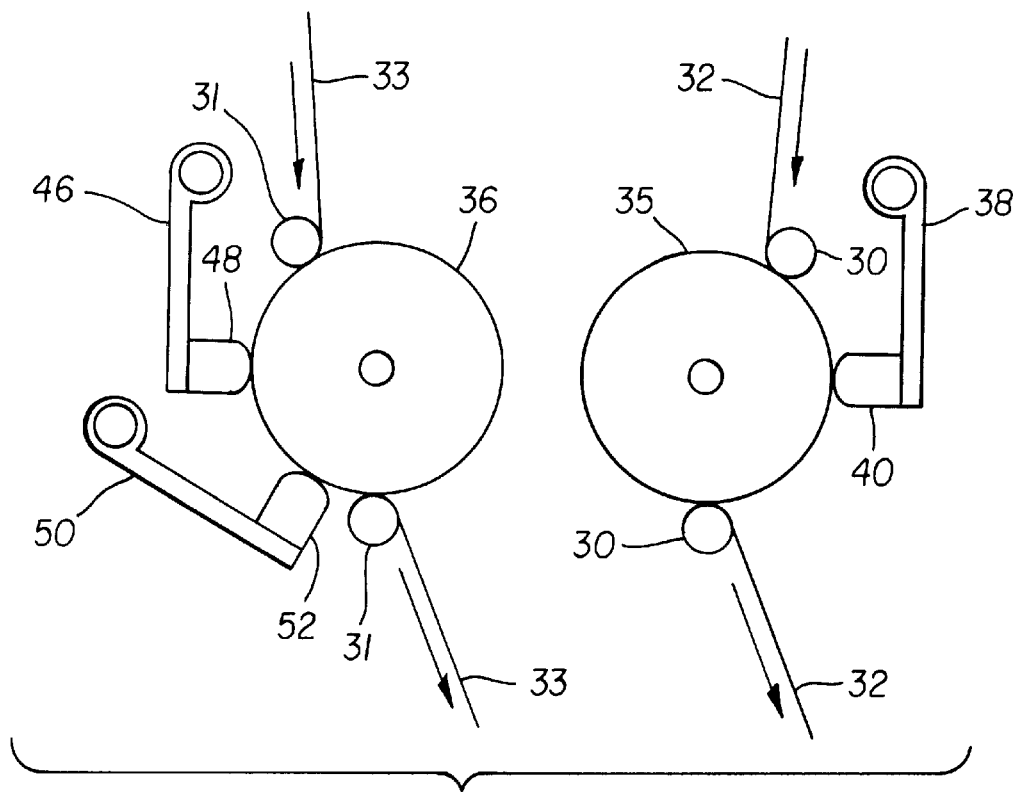
FIG. 2 is a diagram showing a system for transferring audio information from a motion picture camera negative film to a motion picture positive print film.

FIG. 2 is a schematic diagram showing apparatus for transferring audio information from a motion picture camera negative film to a motion picture positive print film. Rollers 30 guide the camera negative film 32 onto playback drum 35. Likewise, rollers 31 guide the positive print film 33 onto record drum 36. Audio information from the transparent magnetic recording layer contained on the backside of camera negative film 32 is picked up by a magnetic read head 40 attached to head mount 38 and fed to a preamplifier (not shown) and peak detector (not shown) similar to that used for any other playback equipment and then fed through an appropriate driver (not shown) to the write head 48 attached to head mount 46 which transfers the audio information onto the transparent magnetic recording layer on the backside of the positive print film 33. An additional read head 52 attached to head mount 50 can be used to verify the audio information transferred to the positive print film.

After transfer of the audio information to the positive print film, the film may be processed in a conventional manner. The positive print film is then viewed in a motion picture film projector equipped with a magnetic read head thus enabling one to view the film scene image with a synchronized integral audio soundtrack. The exact position of the magnetic read head in the projector can vary from projector type to projector type, depending on where space is available to mount the magnetic head. However, the magnetic read head must be in the film path prior to the projector lamp and lens (unless the audio information is recorded in an area of the film in advance of the image scene to which it corresponds). Where the audio information is recorded within the image frame to which it corresponds, it is accordingly necessary to temporarily store the audio information read for a particular frame in memory thus delaying playback of this audio information until the image frame corresponding to the audio information is in line with the projector lens so that audio and image remain synchronized.

Figure 3:
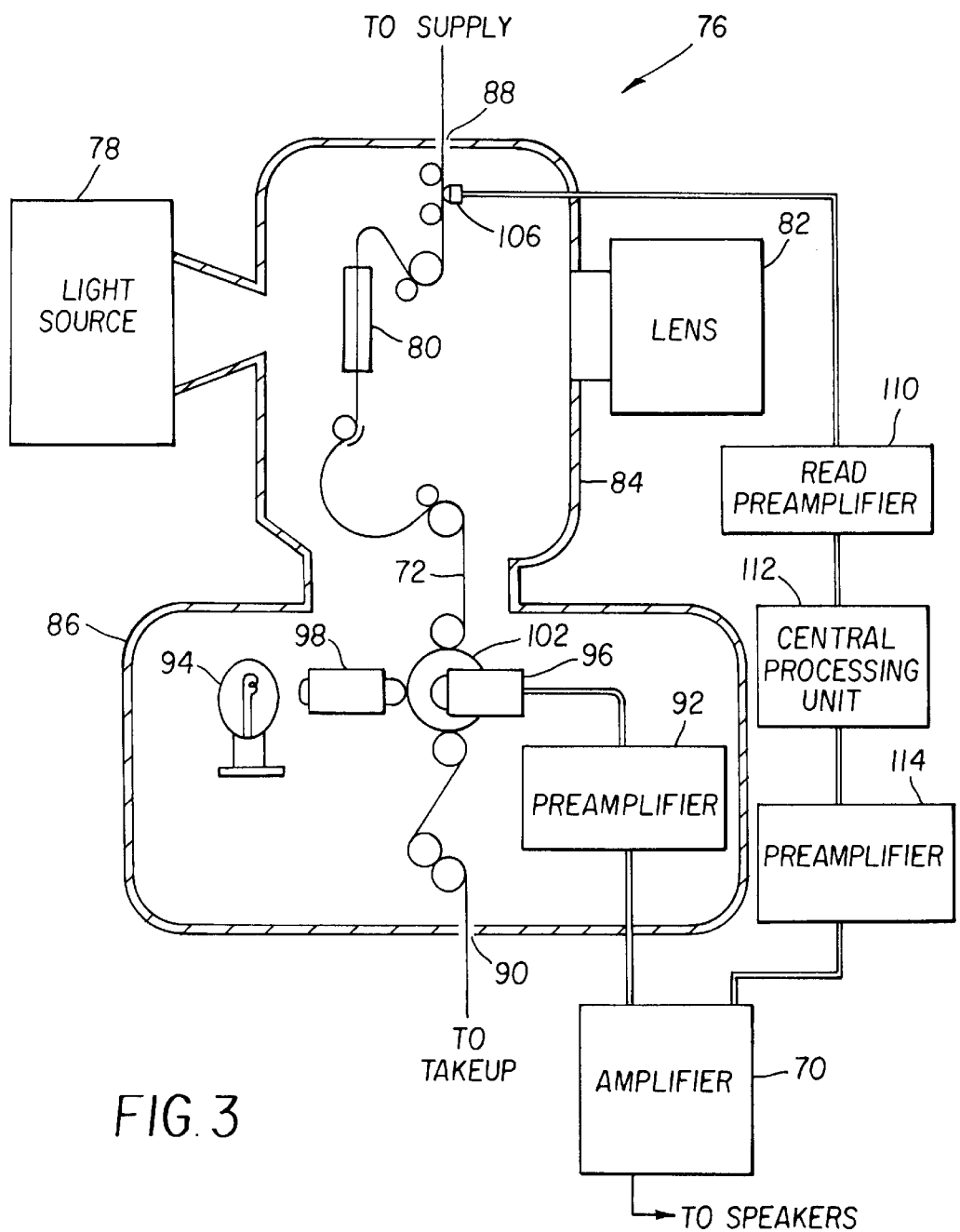
FIG. 3 is a schematic diagram of a motion picture projector that allows playback of audio information recorded on a transparent magnetic recording layer on a motion picture positive print film.

Referring now to FIG. 3, wherein a schematic diagram of a motion picture projector for use in the present invention is illustrated. The motion picture projector 76 is essentially a conventional motion picture projector that additionally allows playback of audio information read from a transparent magnetic recording layer contained on the positive print film. The motion picture projector 76 includes a projection light source 78, a film gate 80 and a projection lens 82 associated with projection housing 84. The motion picture projector 76 is also depicted with a conventional sound assembly housing 86 typically used for reading optical soundtracks printed on the positive print film, which is not needed for sound reproduction in the practice of the present invention. The sound assembly housing 86 includes a light source 94, sound system lens 98, photodetectors 96 and preamplifier 92. In the practice of the present invention, positive print film 72 enters the projection housing 84 from a supply (not shown) through opening 88 in the top of projection housing 84. Audio information stored on the transparent magnetic recording layer contained on the backside of positive print film 72 is picked up by a magnetic read head 106 mounted in the projection housing 84, fed to read preamplifier 110, then sent to central processing unit 112 where the audio information may undergo error correction, decoding, and decompression. The audio signal is next fed to preamplifier 114 and then the output of preamplifier 114 is amplified by amplifier 70 and sent to the theater speaker system. The positive print film 72 then passes through film gate 80, out of the projection housing 84 and into the sound assembly housing 86. In the sound assembly housing 86, the positive print film 72 passes partially around drum 102 and passes between the sound system lens 98 and the photodetector 96 before exiting the sound assembly housing 86 through opening 90. In the practice of the present invention the light source 94 would not need to be operated and the preamplifier 92 may be switched out of the sound system circuit.

Figure 4:
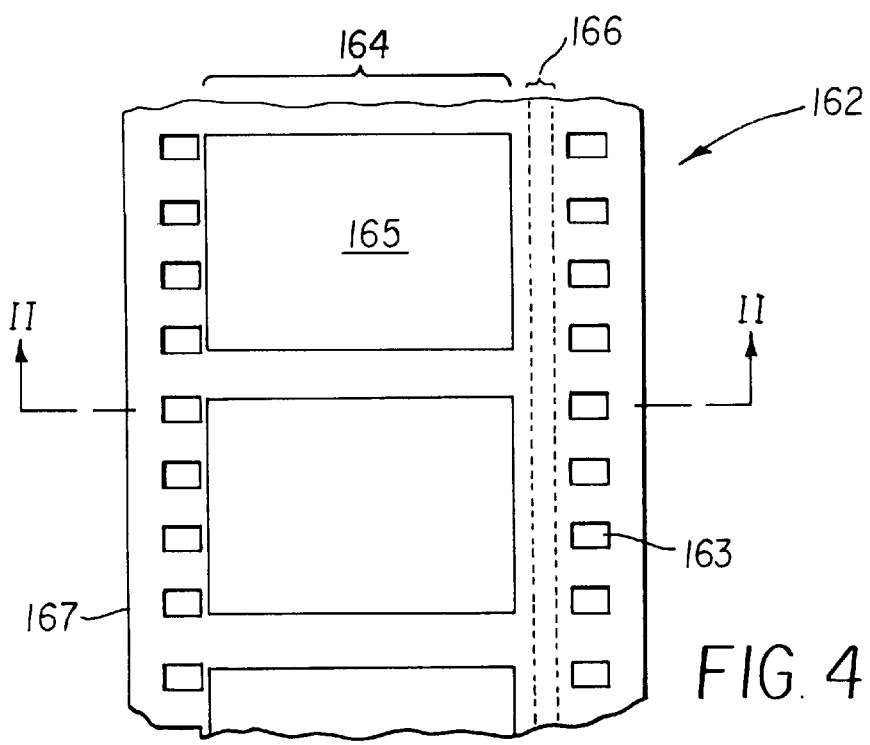
FIG. 4 is a top plane view of a motion picture film having a transparent magnetic recording layer useful in the practice of the present invention.
Figure 5:
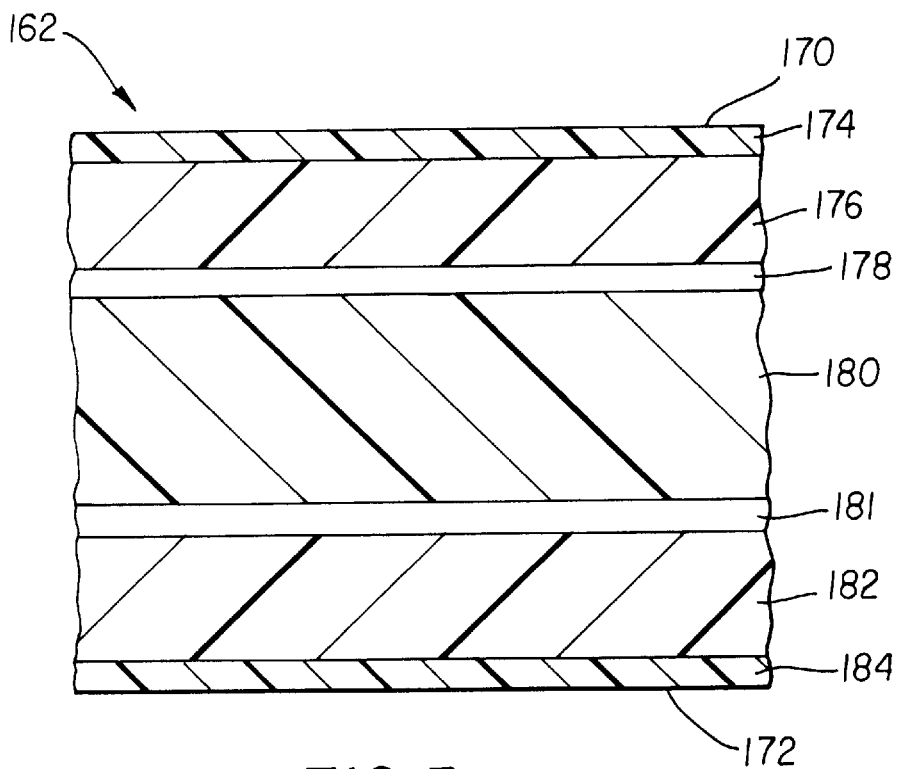
FIG. 5 is a cross-sectional view of the motion picture film of FIG. 4 as taken along line II—II.

Referring now to FIGS. 4 and 5 there is shown a motion picture film 162 for use in the present invention, FIG. 4 shows a top plane view of the motion picture film 162 while FIG. 5 is a cross-sectional view of the motion picture film 162 of FIG. 4 as taken along line II—II.

On motion picture film 162 there is provided image area 164 wherein images 165 are formed in light-sensitive image recording layer(s) 182. Also provided on motion picture film 162 is magnetic recording area 166, which in the particular embodiment illustrated is disposed laterally outside of the image area 164 and adjacent to the perforations 163. This "inboard" location for the magnetic recording area 166 is preferred since the film is very flat in this area which insures good film to magnetic read or write head contact. However, since the transparent magnetic recording layer 176 is coated across the entire film surface, the magnetic recording area 166 may be located elsewhere. For example, between the film perforations 163 and the edge of the film 167 on either side or both sides of the motion picture film 162.

Referring now to FIG. 5, the motion picture film 162 comprises a backside surface 170 and a frontside surface 172. The motion picture film 162 includes a support member 180 and disposed on one side thereof, in order from the backside surface 170, a thin lubricant layer 174, a transparent magnetic recording layer 176, and, in the particular embodiment illustrated, an antistatic layer 178. Optionally, a priming or subbing layer (not shown) which is well known in the photographic art may be employed between the antistatic layer 178 and the support member 180 in order to improve adhesion. Disposed on the opposite side of the support member 180, in order from the frontside surface 172, a protective overcoat layer 184, light-sensitive image recording layer(s) 182, and, in the particular embodiment illustrated, an antihalation underlayer 181. Optionally, a priming or subbing layer (not shown) which is well known in the photographic art may be employed between the antihalation underlayer 181 and the support member 180 in order to improve adhesion.

The materials employed as the support member are synthetic high molecular weight polymeric materials. These materials may be comprised of various polymeric films, but polyester and cellulose triacetate film supports, which are well known in the art, are preferred. The thickness of the support is not critical. Conventional support member thicknesses of from about 50 to 250 microns (2 to 10 mils, or 0.002 to 0.010 inches) can be employed, for example, with very satisfactory results. If the thickness is below 50 microns, the emulsion induced curl makes it difficult to maintain head/media contact without increasing the load and wear on the film surface. If the thickness is more than 250 microns the media is very stiff and this affects film transport and head media contact as well as reducing the length of film that can be loaded into a magazine. Polyester support members typically employ an undercoat or primer layer between the functional layers and the polyester support. Such undercoat layers are well known in the art and comprise, for example, a vinylidene chloride/methyl acrylate/itaconic acid terpolymer or vinylidene chloride/acrylonitrile/acrylic acid terpolymer as described in U.S. Pat. Nos. 2,627,088; 2,698,235; 2,698,240; 2,943,937; 3,143,421; 3,201,249; 3,271,178 and 3,501,301.

The motion picture negative and print films useful in the practice of the present invention comprise at least one light sensitive image recording layer. Such films can be simple black-and-white or monochrome elements or they can be multilayer and/or multicolor elements. Color photographic films useful for this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art. Color negative films are a class of photosensitive materials that map the luminance (neutral) and chrominance (color) information of a scene to complementary tonal and hue polarities in the negative film. Light areas of the scene are recorded as dark areas on the color negative film, and dark areas of the scene are recorded as light areas on the color negative film. Colored areas of the scene are recorded as complementary colors in the color negative film: red is recorded as cyan, green is recorded as magenta, blue is recorded as yellow, etc. In order to render an accurate reproduction of a scene recorded in a color negative film, a subsequent process is necessary to reverse the luminance and chrominance information back to those of the original scene. In the motion picture industry, one such subsequent process is to optically print (by contact or optics) the color negative film onto another negative working photosensitive material, such as a color print film, to produce a color positive image suitable for projection. Photographic print films typically use relatively small grain, high chloride emulsions (e.g., emulsions having average grain size equivalent circular diameters of less than about 1 micron and halide contents of greater than 50 mole % chloride) in order to optimize print image quality and enable rapid processing. Such emulsions typically result in relatively low speed photographic elements in comparison to camera negative films. Low speed is compensated for by the use of relatively high intensity print lamps or lasers for exposing such print elements. For comparison purposes, it is noted that motion picture color print films, e.g., when rated using the same international standards criteria used for rating camera negative films, would typically have an ISO speed rating of less than 10, which is several stops slower than the slowest camera negative films in current use. The compositions of typical light sensitive image recording layers used in origination negative films and print films are well known, and are not critical to the invention, as any of the silver halide materials used in conventional motion picture films may be used, such as those described, e.g., in *Research Disclosure*, Item 36544, September, 1994, and the references listed therein.

The motion picture films useful in the practice of the present invention include a transparent magnetic recording layer. Transparent magnetic recording layers for use on imaging elements such as photographic films are well known in the imaging art and are described, for example, in U.S. Pat. Nos. 3,782,947; 4,279,945; 4,302,523; 4,990,276; 5,147,768; 5,215,874; 5,217,804; 5,227,283; 5,229,259; 5,252,441; 5,254,449; 5,294,525; 5,335,589; 5,336,589; 5,382,494; 5,395,743; 5,397,826; 5,413,900; 5,427,900; 5,432,050; 5,457,012; 5,459,021; 5,491,051; 5,498,512; 5,514,528 and others; and in Research Disclosure, item No. 34390 (November, 1992). Preferably, such magnetic recording layer comprises materials of the type employed in the recently commercialized Advanced Photo System and described in U.S. Pat. Nos. 5,395,743; 5,397,826; 5,427,900; 5,432,050; 5,436,120; and 5,424,037. While the use of magnetic recording layers with motion picture films has been previously suggested as discussed above with respect to DATAKODE systems, compared to the newly commercialized Advanced Photo System consumer films in which the magnetic recording layer is about 1.2 $\mu$m thick, the DATAKODE magnetic control surface was a relatively thick layer of magnetic oxide (about 5 micron) that was coated across the entire surface of a roll of motion picture film. The DATAKODE magnetic recording layer had limited recording density capability due to its wide pulse width, leading to poorer resolution between flux reversals, and imparted undesirable optical density and color to the motion picture film. In addition, the DATAKODE magnetic recording layer was overcoated with a carbon black-containing layer which functioned as an antihalation layer and antistatic layer for the unprocessed film. The presence of this carbon black-containing overcoat on unprocessed films created a spacing loss between the magnetic recording layer and the magnetic read and write heads, thus negatively impacting the magnetic recording characteristics of the DATAKODE film by reducing signal amplitude and increasing the noise levels. Thus it would be undesirable for use in the practice of the present invention. Accordingly, in preferred embodiments of the invention, a photographic film is used employing a relatively thinner magnetic recording layer in combination with antistatic and antihalation layers as described below, rather than a relatively thick magnetic recording layer in combination with a carbon black-containing overcoat backing layer as employed with DATAKODE films.

Transparent magnetic recording layers that may be effectively employed for the purpose of the present invention comprise a film-forming polymeric binder, ferromagnetic particles, and other optional addenda for improved manufacturability or performance such as dispersants, coating aids, fluorinated surfactants, crosslinking agents or hardeners, catalysts, charge control agents, lubricants, abrasive particles, filler particles, plasticizers and the like.

Suitable ferromagnetic particles comprise ferromagnetic iron oxides, such as: $\gamma$-$Fe_2O_3$ or magnetite; $\gamma$-$Fe_2O_3$ or magnetite with Co, Zn, Ni or other metals in solid solution or surface-treated; ferromagnetic chromium dioxides such as $CrO_2$ or $CrO_2$ with Li, Na, Sn, Pb, Fe, Co, Ni, Zn or halogen atoms in solid solution; ferromagnetic hexagonal ferrites, such as barium and strontium ferrite; ferromagnetic metal alloys with protective oxide coatings on their surface to improve chemical stability. Other surface-treatments of magnetic particles to increase chemical stability or improve dispersability known in the conventional magnetic recording art may also be practiced. In addition, ferromagnetic oxide particles can be overcoated with a shell consisting of a lower refractive index particulate inorganic material or a polymeric material with a lower optical scattering cross-section as taught in U.S. Pat. Nos. 5,217,804 and 5,252,444. Suitable ferromagnetic particles can exhibit a variety of sizes, shapes, and aspect ratios. Particularly preferred ferromagnetic particles for use in transparent magnetic layers on motion picture films for use in the present invention include cobalt surface-treated $Fe_3O_4$ (magnetite) with a specific surface area greater than 30 $m^2$/g, preferably more than 40 $m^2$/g.

As taught in U.S. Pat. No. 3,782,947, whether an imaging element is useful for both photographic and magnetic recording depends both on the size distribution and the concentration of the ferromagnetic particles and on the relationship between the granularities of the magnetic and photographic layers. Generally, the coarser the grain of the silver halide emulsion in the photographic film containing a magnetic recording layer, the larger the mean size of the magnetic particles which are suitable. A magnetic particle coverage for the magnetic layer of from about 10 to 1000 mg/$m^2$, when uniformly distributed across the imaging area of a photographic imaging element, provides a magnetic layer that is suitably transparent to be useful for photographic imaging applications for magnetic particles with a maximum primary particle size of less than about 0.1 $\mu$m. Magnetic particle coverages less than about 10 mg/$m^2$ tend to be insufficient for magnetic recording purposes using inductive write/read heads.

Magnetic particle coverages greater than about 1000 mg/$m^2$ tend to produce magnetic layers with optical densities too high for photographic imaging. To minimize layer thicknesses, particle coverages of less than 200 mg/$m^2$ are desired, while particularly useful particle coverages are in the range of 20 to 70 mg/$m^2$. Magnetic particle volume concentrations in the coated layers of from about $1\times10^{-11}$ mg/$mm^3$ to $1\times10^{-10}$ mg/$mm^3$ are particularly preferred for transparent magnetic layers prepared for use in photographic elements of this invention. A typical thickness for the transparent magnetic layer is in the range from about 0.05 to 10 $\mu$m, preferably less than 4 $\mu$m, more preferably less than or equal to 1.2 $\mu$m, even more preferably less than or equal to 0.7 $\mu$m and most preferably less than or equal to 0.5 $\mu$m. Practical difficulties exist in making thin films, including preparation of high quality, narrow size distribution dispersions of small particles of magnetic pigments, abrasive/head polishing powders and antistat particles. Other difficulties include maintaining coating thickness uniformity and achieving good layer adhesion and durability. Such difficulties may be addressed in accordance with the teachings of the above and below referenced patents.

In order to provide acceptable-quality voice reproduction, a bandwidth of at least 4,000 cycles per second (Hz) is required. To digitize the signal with reasonable fidelity, it should be sampled at the Nyquist rate of two samples per cycle, and each sample should have a resolution of eight bits. Hence, the minimum digital-data rate that must be recorded is (4,000 cycles per second)×(2 samples per cycle)×(8 bits per sample)=64,000 bits per second. The Advanced Photo System specification (Eastman Kodak Company, Release 4.30, Sep. 17, 1997) defines a maximum recording density of 120 flux transitions per 5 millimeter. The cameras used in this system, being low-cost consumer devices, have film-transport mechanisms that exhibit high levels of instantaneous speed variation (known as "jitter"). In order to accommodate this, a jitter-tolerant—and consequently low-efficiency—modulation code is used. This self-clocking peak position modulation code uses three flux transitions to code each data bit, which limits the data-storage density of the system to (120 flux transitions per millimeter)÷(3 flux transitions per bit)=40 bits per millimeter. The significantly reduced levels of jitter to be expected in motion-picture cameras should enable the use of a highly efficient, jitter-tolerant nonlinear run-length-limited modulation code such as that taught in U.S. Pat. No. 5,742,244. Such a code requires as few as 1.25 flux transitions to code one bit while accommodating moderate levels of jitter. The use of such a code would provide a storage density of (120 flux transitions per millimeter)÷(1.25 flux transitions per bit)=96 bits per millimeter. Using a reasonable error-correction and data-format overhead of 25%, 75% of the data stored is available for user data, resulting in an effective storage density of (96×0.75)=72 bits per millimeter. Hence, at the customary motion-picture film-transport speed of 450 millimeters per second, a data rate of 72×450=32,400 bits per second is obtained. Accordingly, the data rate of 64,000 bits per second required to record digitized sound of 4,000-Hz bandwidth can be achieved with two data tracks on the motion-picture film.

Still further improvements in storage density can be realized by reducing the thickness of the transparent magnetic layer to less than the 1.2 μm of the Advanced Photo System, and reducing the maximum read-to-write azimuth error to less than the 1.5 degrees of the Advanced Photo System. These measures will reduce the width of readback pulses and so enable recording at a flux-transition density of more than 120 per millimeter. The resultant increase in data rate would permit recording of sounds occupying a broader frequency spectrum than voice.

Suitable polymeric binders for use in the magnetic layer include, for example: vinyl chloride based copolymers such as, vinyl chloride-vinyl acetate copolymers, vinyl chloride-vinyl acetate-vinyl alcohol terpolymers, vinyl chloride-vinyl acetate-maleic acid terpolymers, vinyl chloride-vinylidene chloride copolymers, vinyl chloride-acrylonitrile copolymers ; acrylic ester-acrylonitrile copolymers, acrylic ester-vinylidene chloride copolymers, methacrylic ester-vinylidene chloride copolymers, methacrylic ester-styrene copolymers, thermoplastic polyurethane resins, phenoxy resins, polyvinyl fluoride, vinylidene chloride-acrylonitrile copolymers, butadiene-acrylonitrile copolymers, acrylonitrile-butadiene-acrylic acid terpolymers, acrylonitrile-butadiene-methacrylic acid terpolymers, polyvinyl butyral, polyvinyl acetal, cellulose derivatives such as cellulose esters including cellulose nitrate, cellulose acetate, cellulose diacetate, cellulose triacetate, cellulose acetate butyrate, cellulose acetate propionate, and mixtures thereof, and the like; styrene-butadiene copolymers, polyester resins, phenolic resins, epoxy resins, thermosetting polyurethane resins, urea resins, melamine resins, alkyl resins, urea-formaldehyde resins and other synthetic resins. Preferred binders for organic solvent-coated transparent magnetic layers are polyurethanes, vinyl chloride-based copolymers and cellulose esters, particularly cellulose diacetate and cellulose triacetate.

The binder for transparent magnetic layers can also be film-forming hydrophilic polymers such as water soluble polymers, cellulose ethers, latex polymers and water soluble polyesters as described in Research Disclosures Nos. 17643 (December, 1978) and 18716 (November, 1979) and U.S. Pat. Nos. 5,147,768; 5,457,012; 5,520,954 and 5,531,913. Suitable water-soluble polymers include gelatin, gelatin derivatives, casein, agar, starch derivatives, polyvinyl alcohol, acrylic acid copolymers, and maleic acid anhydride. Suitable cellulose ethers include carboxymethyl cellulose and hydroxyethyl cellulose. Other suitable aqueous binders include aqueous latices of addition-type polymers and interpolymers prepared from ethylenically unsaturated monomers such as acrylates including acrylic acid, methacrylates including methacrylic acid, acrylamides and methacrylamides, itaconic acid and its half-esters and diesters, styrenes including substituted styrenes, acrylonitrile and methacrylonitrile, vinyl acetates, vinyl ethers, vinyl chloride copolymers and vinylidene chloride copolymers, and butadiene copolymers and aqueous dispersions of polyurethanes or polyesterionomers. The preferred hydrophilic binders are gelatin, gelatin derivatives and combinations of gelatin with a polymeric cobinder. The gelatin may be any of the so-called alkali- or acid-treated gelatins.

Optionally, the binder in the magnetic layer may be cross-linked. Binders which contain active hydrogen atoms including —OH, —NH(2), —NHR, where R is an organic radical, and the like, can be crosslinked using an isocyanate or polyisocyanate as described in U.S. Pat. No. 3,479,310. Suitable polyisocyanates include: tetramethylene diisocyanate, hexamethylene diisocyanate, diisocyanato dimethylcyclohexane, dicyclohexylmethane diisocyanate, isophorone diisocyanate, dimethylbenzene diisocyanate, methylcyclohexylene diisocyanate, lysine diisocyanate, tolylene diisocyanate, diphenylmethane diisocyanate, polymers of the forgoing, polyisocyanates prepared by reacting an excess of an organic diisocyanate with an active hydrogen containing compounds such as polyols, polyethers and polyesters and the like, including ethylene glycol, propylene glycol, dipropylene glycol, butylene glycol, trimethylol propane, hexanetriol, glycerine sorbitol, pentaerythritol, castor oil, ethylenediamine, hexamethylenediamine, ethanolamine, diethanolamine, triethanolamine, water, ammonia, urea, and the like, including biuret compounds, allophanate compounds and the like. A preferred polyisocyanate crosslinking agent is the reaction product of trimethylol propane and 2,4-tolylene diisocyanate sold by Mobay under the tradename Mondur CB 75.

The hydrophilic binders can be hardened using any of a variety of means known to one skilled in the art. Useful hardening agents include aldehyde compounds such as formaldehyde, ketone compounds, isocyanates, aziridine compounds, epoxy compounds, chrome alum, and zirconium sulfate.

Examples of suitable solvents for coating the transparent magnetic layer include: water; ketones, such as acetone, methyl ethyl ketone, methylisobutyl ketone, tetrahydrofuran, and cyclohexanone; alcohols, such as methanol, ethanol, isopropanol, and butanol; esters such as ethyl acetate and butyl acetate, ethers; aromatic solvents, such as toluene; and chlorinated hydrocarbons, such as carbon tetrachloride, chloroform, dichloromethane; trichloromethane, trichloroethane; glycol ethers such as ethylene glycol monomethyl ether, and propylene glycol monomethyl ether; and ketoesters, such as methylacetoacetate. Optionally, due to the requirements of binder solubility, magnetic particle dispersability and coating rheology, a mixture of solvents may be advantageous. A preferred solvent mixture consists of a chlorinated hydrocarbon, ketone and/or alcohol, and ketoesters. Another preferred solvent mixture consists of a chlorinated hydrocarbon, ketone and/or alcohols, and a glycol ether. Preferred solvent mixtures include dichloromethane, acetone and/or methanol, methylacetoacetate; dichloromethane, acetone and/or methanol, propylene glycol monomethyl ether; and methylethyl ketone, cyclohexanone and/or toluene.

As indicated hereinabove, the transparent magnetic layer also may contain additional optional components such as dispersing agents, wetting agents, surfactants or fluorinated surfactants, coating aids, viscosity modifiers, soluble and/or solid particle dyes, antifoggants, matte particles, lubricants, abrasive particles, filler particles, and other addenda that are well known in the photographic and magnetic recording arts.

Useful dispersing agents include fatty acid amines, and commercially available wetting agents such as Witco Emcol CC59 which is a quaternary amine available from Witco Chemical Corp; Rhodofac PE 510, Rhodofac RE 610, Rhodofac RE 960, and Rhodofac LO 529 which are phosphoric acid esters available from Rhone-Poulenc; and polyester-polyamine copolymers described in commonly-assigned U.S. Pat. No. 5,395,743 and which are commercially available as Solsperse 17000, Solsperse 20000, and Solsperse 24000 from Zeneca, Inc. or PS2 and PS3 from ICI.

Suitable coating aids include nonionic fluorinated alkyl esters such as, FC-430 and FC-431 sold by Minnesota Mining and Manufacturing; polysiloxanes such as DC 1248, DC 200, DC 510, DC 190 sold by Dow Corning; and BYK 310, BYK 320, and BYK 322 sold by BYK Chemie; and SF 1079, SF 1023, SF 1054, and SF 1080 sold by General Electric.

Examples of reinforcing filler particles include nonmagnetic inorganic powders with a Moh scale hardness of at least 6. Examples of suitable metal oxides include gamma alumina, chromium (+3) oxide, alpha iron oxide, tin oxide, silica, titania, aluminosilicates, such as zeolites, clays and clay-like materials. Other suitable filler particles include various metal carbides, nitrides, and borides. Preferred filler particles include gamma alumina and silica as taught in U.S. Pat. No. 5,432,050.

Abrasive particles exhibit properties similar to those of reinforcing particles and include some of the same materials, but are typically much larger in size. Abrasive particles are present in the transparent magnetic layer to aid in cleaning of the magnetic heads as is well-known in the magnetic recording art. Preferred abrasive particles are alpha aluminum oxide and silica as disclosed in Research Disclosure, Item No. 36446 (August 1994).

A representative formulation which may be used to form a magnetic recording layer on a photographic film for use in accordance with the invention is as follows:

| Component | Description | Dry Coating Wt, mg/m² |
|---|---|---|
| Magnetic oxide | CSF-408542 Co-$\gamma$-$Fe_2O_3$ (Toda Kogyo Corp.) | 55 |
| Polymer binder | Cellulose diacetate (Eastman Chemical Co.) | 1248 |
| Polymer binder | Cellulose triacetate (Eastman Chemical Co.) | 55 |
| Abrasive particle (head cleaner) | E-600 (Norton) | 36 |
| Grind Solvent | Dibutyl phthalate | 78 |

-continued

| Component | Description | Dry Coating Wt, mg/m² |
|---|---|---|
| Coating Aid | FC-431 (3M Corp.) | 7.2 |
| Dispersant | Rhodafac PE510 (Rhone-Poulenc) | 4.4 |
| Dry Layer Thickness: 1.2 $\mu$m | | |

Additional layers which may be present either above or below the transparent magnetic layer in the motion picture films in accordance with this invention include but are not limited to antistatic layers, abrasion and scratch resistant layers, other protective layers, abrasive-containing layers, adhesion-promoting layers, antihalation layers and lubricant-containing layers overlying the magnetic layer for improved film conveyance and runnability during magnetic reading and writing operations.

Any antistatic materials may be employed in the antistatic layer, such as those previously suggested for use with photographic elements. Such materials include, e.g., ionic polymers, electronic conducting non-ionic polymers, and metal halides of metal oxides in polymer binders. Conductive fine particles of crystalline metal oxides dispersed with a polymeric binder have been used to prepare optically transparent, humidity insensitive, antistatic layers for various imaging applications. Many different metal oxides, such as AnO, $TiO_2$, $ZrO_2$, $Al_2O_3$, $SiO_2$, MgO, BaO, $MoO_3$, and $V_2O_5$, are disclosed as useful as antistatic agents in photographic elements or as conductive agents in electrostatographic elements in such patents as U.S. Pat. Nos. 4,275,103; 4,394,441; 4,416,963; 4,418,141; 4,431,764; 4,495,276; 4,571,361; 4,999,276; and 5,122,445, the disclosures of which are hereby incorporated by reference. Preferred metal oxides are antimony doped tin oxide, aluminum doped zinc oxide, and niobium doped titanium oxide, as these oxides have been found to provide acceptable performance characteristics in demanding environments. Particular preferred metal oxides for use in films in accordance with the invention are antimony-doped tin oxide and vanadium pentoxide which provide good resistance to static discharge.

Suitable lubricants include silicone oil, silicones or modified silicones, fluorine-containing alcohols, fluorine-containing esters, polyolefins, polyglycols, alkyl phosphates and alkali metal salts thereof, polyphenyl ethers, fluorine-containing alkyl sulfates and alkali metal salts thereof, monobasic fatty acids having 10 to 24 carbon atoms and metal salts thereof, alcohols having 12 to 22 carbon atoms, alkoxy alcohols having 12 to 22 carbon atoms, esters of monobasic fatty acids having one of monovalent, divalent, trivalent, tetravalent, pentavalent and hexavalent alcohols, fatty acid esters of monoalkyl ethers of alkylene oxide polymers, fatty acid amides and aliphatic amines.

Specific examples of these compounds (i.e., alcohols, acids or esters) include lauric acid, myristic acid, palmitic acid, stearic acid, behenic acid, butyl stearate, oleic acid, octyl stearate, amyl stearate, isocetyl stearate, octyl myristate, butoxyethyl stearate, anhydrosorbitan monostearate, anhydrosorbitan distearate, anhydrosorbitan tristearate, pentaerythrityl tetrastearate, oleyl alcohol and lauryl alcohol. Carnauba wax is preferred.

Representative examples of backing layer packages comprising a transparent magnetic recording layer, an antistatic layer, and a thin lubricant layer which may be employed in the motion picture films for use in accordance with the invention are disclosed, e.g., in U.S. Pat. Nos. 5,395,743;

5,397,826; 5,427,900; 5,432,050; 5,436,120; and 5,424,037, the disclosures of which are incorporated by reference herein.

The antihalation undercoat layer that may be employed in the photographic films useful in this invention functions to prevent light from being reflected into the silver halide emulsion layer(s) and thereby causing an undesired spreading of the image which is known as halation. Any of the filter dyes known to the photographic art can be used in the present invention as a means of reducing halation. Thus, for example, water-soluble dyes can be used for this purpose. Such dyes should be incorporated in the antihalation undercoat with a mordant to prevent dye diffusion. Alternatively, and preferably, a solid particle filter dye is incorporated in the antihalation undercoat. Soluble and solid particle filter dyes that may successfully employed in the antihalation layer include those described in commonly-assigned U.S. Pat. No. 5,679,505 which is incorporated herein by reference.

In addition to a transparent magnetic recording layer, one or more silver halide emulsion layers, and optional antihalation underlayer and antistatic layer, the photographic films useful for the present invention can contain auxiliary layers conventional in photographic elements, such as overcoat layers, spacer layers, electrically conductive layers, filter layers, interlayers, pH lowering layers (sometimes referred to as acid layers and neutralizing layers), timing layers, opaque reflecting layers, opaque light-absorbing layers and the like.

The invention has been described in detail with particular reference to certain preferred embodiments thereof, but it will be understood that variations and modifications can be effected within the spirit and scope of the invention.

We claim:

1. A process for viewing a positive motion picture film scene image with an accompanying original audio soundtrack comprising:

providing a motion picture origination negative film comprising a support bearing at least one light sensitive image recording layer and a transparent magnetic recording layer;

optically recording a motion picture scene in the motion picture negative film by exposing the film in a motion picture camera, and simultaneously recording contemporaneous original audio information in the magnetic recording layer on a frame-by-frame basis in synchronization with the scene image;

providing a motion picture print film comprising a support bearing at least one light sensitive image recording layer and a transparent magnetic recording layer;

printing the negative film scene image onto the motion picture print film to form a positive scene image, and transferring the original audio information from the magnetic recording layer of the negative film to the magnetic recording layer of the print film in synchronization with the printed scene image, and projecting the print film scene image for viewing while simultaneously reading and playing back the original audio information recorded in the magnetic recording layer.

2. A process according to claim 1, wherein the contemporaneous original audio information is recorded in the magnetic recording layer of the negative film within the image scene film frame for which the audio information corresponds.

3. A process according to claim 2, wherein the original audio information recorded in the magnetic recording layer of the negative film is transferred on-line to the magnetic recording layer of the print film in synchronization with the printed scene image during printing of the negative film scene image onto the motion picture print film to form a positive scene image.

4. A process according to claim 1, wherein the original audio information recorded in the magnetic recording layer of the negative film is transferred on-line to the magnetic recording layer of the print film in synchronization with the printed scene image during printing of the negative film scene image onto the motion picture print film to form a positive scene image.

5. A process according to claim 1, wherein the negative film additionally comprises an antihalation undercoat layer between the support and the tight sensitive image recording layer and an antistatic layer.

6. A process according to claim 5, wherein the magnetic recording layer comprises magnetic particles at a coverage in the range of 20 to 70 mg/m$^2$.

7. A process according to claim 6, wherein the magnetic recording layer thickness is less than 4 $\mu$m.

8. A process according to claim 6, wherein the magnetic recording layer thickness is less than or equal to 1.2 $\mu$m.

9. A process according to claim 1, wherein the magnetic recording layer thickness is less than 4 $\mu$m.

10. A process according to claim 1, wherein the magnetic recording layer thickness is less than or equal to 1.2 $\mu$m.

* * * * *